United States Patent [19]

Grünenfelder

[11] Patent Number: 5,504,754
[45] Date of Patent: Apr. 2, 1996

[54] METHOD AND ARRANGEMENT FOR THE LOAD TESTING OF A SWITCH FOR CELL STRUCTURED DIGITAL DATA

[75] Inventor: Reto Grünenfelder, Dietlikon, Switzerland

[73] Assignee: Alcatel STR A.G., Zurich, Switzerland

[21] Appl. No.: 222,833

[22] Filed: Apr. 5, 1994

[30] Foreign Application Priority Data

Apr. 8, 1993 [CH] Switzerland .................. 1072/93

[51] Int. Cl.$^6$ ..................................... G01R 31/28
[52] U.S. Cl. ............... 371/20.1; 371/20.5; 371/20.6; 370/15; 370/16.1; 370/60.1; 370/85.12; 370/85.14
[58] Field of Search ................ 371/20.1, 20.2, 371/20.5, 20.6, 29.1, 34; 370/13.1, 14, 15.1, 16.1, 57, 58.1, 60.1, 62, 85.5, 85.12, 85.15, 91, 94.1

[56] References Cited

U.S. PATENT DOCUMENTS

| 5,166,926 | 11/1992 | Cisneros et al. | 370/94.1 |
|---|---|---|---|
| 5,251,204 | 10/1993 | Izawa et al. | 370/15 |
| 5,257,311 | 10/1993 | Naito et al. | 375/114 |
| 5,265,088 | 11/1993 | Takigawa et al. | 370/15 |
| 5,299,209 | 3/1994 | Murayama et al. | 371/67.1 |
| 5,373,504 | 12/1994 | Tanaka et al. | 370/60.1 |

FOREIGN PATENT DOCUMENTS

| 0477553 | 4/1992 | European Pat. Off. |
|---|---|---|
| 0511671 | 11/1992 | European Pat. Off. |
| 0518199 | 12/1992 | European Pat. Off. |

OTHER PUBLICATIONS

*Method and Arrangement for Testing Switch–Network Components* IBM Technical Disclosure Bulletin, Bd. 31, No. 8, Jan. 1989, Armonk, NY, pp. 414–427.

Primary Examiner—Robert W. Beausoliel, Jr.
Assistant Examiner—Dieu-Minh Le
Attorney, Agent, or Firm—Ware, Fressola, Van Der Sluys & Adolphson

[57] ABSTRACT

A switching unit (1) for the switching through of different types of digital data in the asynchronous transfer mode, a so-called ATM-switch, is to be tested whether it is able to overcome a specific load. The installation provides for the feedback (4) from outputs (2) to inputs (3) of baseload cells, which are fed by a generator (5) to an input (35), and constantly circulate because of their routing information. The generator (5) also emits test cells to the input (35). A chooser or discriminator (6) is connected to a measuring output (21) and feeds it back (41) to an input (31). The chooser (6) is able to read, change, copy or suppress certain contents of data cells. It routs the cells back and/or through a second output and an analyzer (7), which evaluates them statistically. Load testing of such a switching unit, whether it can handle a specific load, may cause instabilities in the switch, such as uncontrolled cell loss, congestion, routing errors and the like. The inventive method for load testing the switch has two stages. In a first stage, data cells are supplied to the switch successively and in a controlled manner until a base load near the specified load is reached. In a second stage, the data flow of this base load is altered by rerouting individual cells and superimposing test cells. In this way, any instabilities that occur as a result of overload can immediately be brought under control.

9 Claims, 2 Drawing Sheets

5,504,754

METHOD AND ARRANGEMENT FOR THE LOAD TESTING OF A SWITCH FOR CELL STRUCTURED DIGITAL DATA

TECHNICAL FIELD

The invention is in the area of testing switching installations and concerns the load test of a switching center for the asynchronous transfer of structured digital data, particularly data cells.

BACKGROUND OF THE INVENTION

The worldwide buildup of integrated communication networks for broad-band applications creates ever more switching centers for switching through different types of digital data in the ATM—Asynchronous Transfer Mode, according to a CCITT recommendation. The actual ATM switching unit receives the randomly arriving, marked data cells at a number of its inputs, marks them again and guides them to the proper one of its many outputs, so that the respective data cells arrive at their destination as quickly as possible. If the traffic is too high, the loss of cells and thereby the loss of data can occur, in spite of buffer memories. A switching unit must therefore be tested to determine whether it can handle the specified load.

The current means for load testing are so-called benchmark tests, which are defined, specially generated input signals that presuppose certain results. Deviations provide information about the functional ability of the test sample. Because of the large number of in- and outputs, the individual control of all inputs and the measurement of all outputs is not economically feasible—each input to be addressed requires a transmitting unit, each output to be measured requires a receiving unit. It is therefore commonplace to test only one or a few in- and outputs with the benchmark signal. In order for a baseload to be nonetheless available, at least one other input receives a baseload signal from a separate generator. It is marked so that it gets switched from an input to the output with the same number. Outputs that do not take part in the bench mark test are fed back to the next input, so that the baseload successively passes through all of these in- and outputs. This simulates additional traffic. However, the process has the disadvantage that errors which occur e.g. as a result of overload or intentional input, continue in batches and it becomes difficult to maintain defined conditions that allow the test signal to be evaluated.

DISCLOSURE OF INVENTION

An object of the present invention is therefore to provide a process and an arrangement, whereby an ATM switching unit can be loaded to the limit of its error-free operation at low cost, and an overload can be detected and evaluated.

According to the present invention, a method for load testing of a switch for cell structured digital data switched through in an asynchronous transfer mode based on their carried-along labeled information which preloads the switch by a baseload of circulating data cells and, at the same time, loads it by test data, comprises the steps of successively feeding data cells in a circulating manner between an assignable input and output of the switch according to data cell content until a determined baseload is achieved and superposing test sequences on at least one output which are separated from the baseload cells by a discrimination at said at least one output and provided for analysis.

In further accord with the present invention, the test sequence contains labeling path cells which alter the labeled path in the switch for one or more of the circulating data cells, such modulating the baseload.

According still further to the present invention, the switching errors are used to influence the test sequences in such a way that the load is reduced in case of an error accumulation.

In accordance still further with the present invention, the discrimination moreover eliminates data cells of the baseload from the circulation until the error accumulation vanishes and wherein the baseload is rebuilt.

According further to the present invention, the baseload and the test sequence are fed to the same input.

In a first stage of the process, according to the invention, a controlled predetermined baseload is established for the switching unit near its load limit. To that end, each output of the switching unit is physically connected back to another input not being used otherwise—any extra in- and outputs remain unused. A signal generator supplies successive baseload data cells to another input, several generators can be used for several inputs, the cells are individually marked so that they always circulate via the same path from that moment on, preferably to a single in- and output. A chooser (discriminator) is switched into the feedback at a predetermined output, i.e., the measuring output, and a signal analyzer is connected. The measurement during this first process step permits a determination of how large the load is, and if stable conditions exist. It is sufficient to measure a single output, thanks to the symmetrical load distribution over all the participating outputs.

In a second stage of the process of the invention, a test sequence is supplied by the above-named signal generator to the same input when a certain baseload has been reached. It goes to the measuring output via the path determined by the marking of the cells, where it is separated by the chooser and fed to the signal analyzer. The measurement results, particularly the relative arrival times of the cells, and all possible transmission errors, provide information about the unit's function.

In a preferred configuration variation, the test sequence contains routing cells, which temporarily change the configured path of individual baseload data cells, and direct them to the measuring output. The chooser influences these cells and sends them back to their original output via the feedback path. In this way the baseload can be modulated in a targeted manner.

In another configuration variation, a recognition of the error rate by the chooser provides that any possible unstable condition is stabilized again through feedback to the signal generator.

These and other objects, features and advantages of the present invention will become more apparent in light of the following detailed description of a best mode embodiment thereof, as illustrated in the accompanying drawing.

BEST MODE FOR CARRYING OUT THE INVENTION

To better understand the invention, first the function of the future test sample is explained in principle, which is a switching unit for switching-through digital data in the asynchronous transfer mode, briefly called ATM-switch. The details of such an ATM-switch need not be known, insofar as the conventions are maintained. It has established in- and outputs for receiving and transmitting signals that carry digital data in the form of normalized data cells. Data cells consist essentially of a cell header, a field having Virtual Path and Channel Identifiers (VPI/VCI) which contain the markings for the local switch-through, and the information field, which contains the useful data. These cells are buffered. The cell header is analyzed and remarked. Internal switching configurations, together with the marking data of the cell header, decide to which output, and by which new marking, the cell will be routed. The useful data remain unchanged. However, the useful data in a type of cell marked accordingly in the cell header, the routing cells, become effective in the switch itself and influence the configuration specifications. Thus, the ATM-switch guides the data cells according to the information contained therein and the existing configuration specifications which are influenced by the routing cells.

Figure 1:
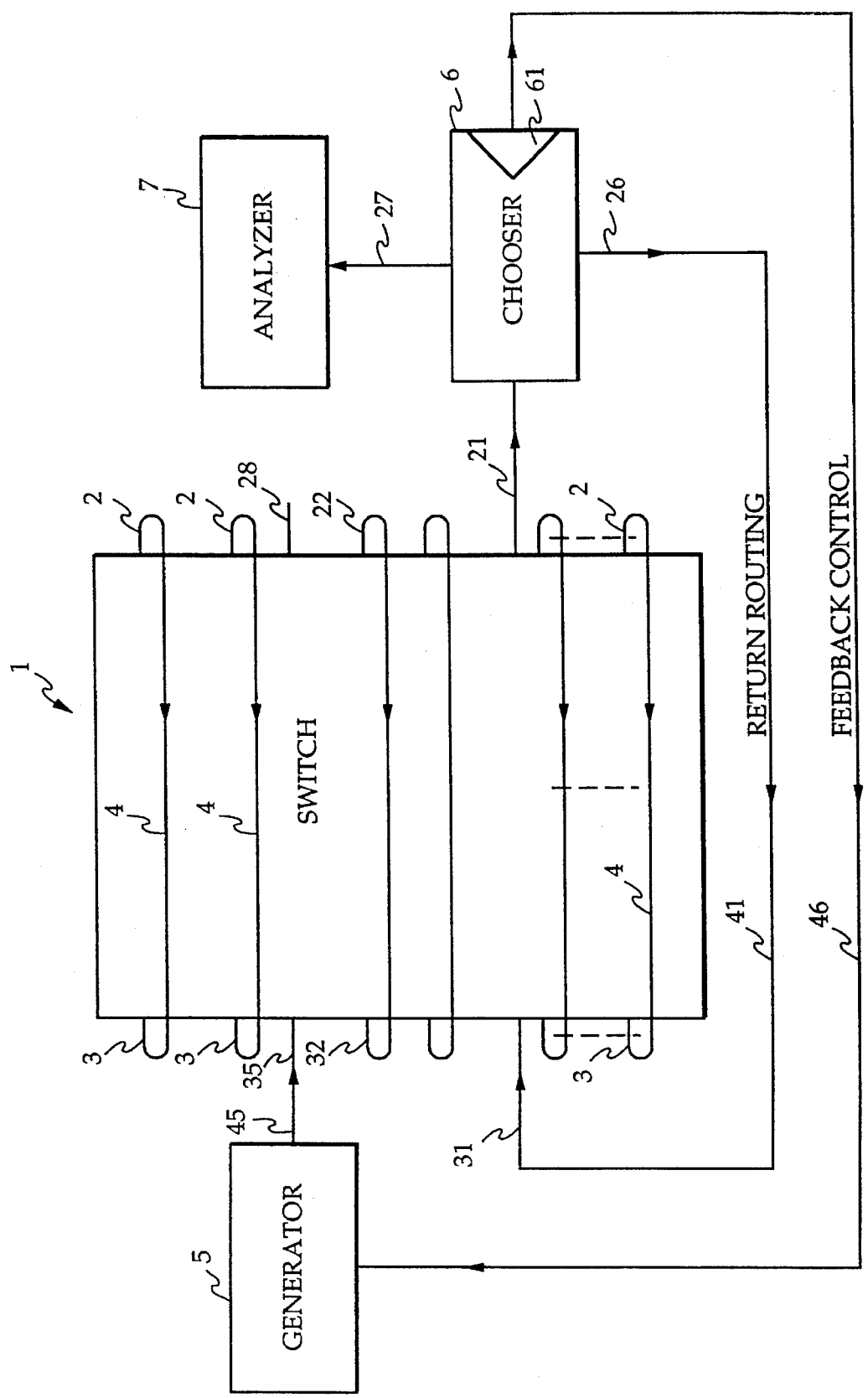
FIG. 1 is an arrangement in principle of the installation for the load testing of a switching unit.

FIG. 1 depicts such an ATM-switch 1 as the test sample. Such switching units usually have several hundred to several thousand in- and outputs. The transmitting and receiving units are relatively expensive, particularly if optical waveguides are used as the transmission medium, which is standard for integrated networks in broad band applications. A testing device must therefore settle for only a few of such units. The testing arrangement provides for feedback of outputs 2 to inputs 3. In this way only the connections 4 are needed, usually ready-made plug-in optical fibers, and no additional transmitting and receiving units, but data cells can still be continuously transmitted and received.

FIG. 1 schematically illustrates the parallel in- and output connections 4. It indicates a control principle of the logic connection, which is relevant to the test performance described further on: data cells circulate from a predetermined input 32 to a predetermined output 22, and from there return to the predetermined input 32. Of course it is physically unimportant which output 2 is connected to which input 3, as long as the routing path table causes the general configuration in the switch that a data cell is continuously circulating through the same in- and outputs.

The logical circuit from input 31 to output 21 and back to input 31 through the connection 41, is the same in all the other circuits. However, the return routing 41 is special because of a chooser or switched-on discriminator 6. The chooser 6 is able to read certain contents of data cells, and to change, copy or suppress them on the basis of that information, and to route them to one of its two outputs, the test circuit output 26 and/or the measuring branch output 27. The analyzer 7 is connected to the latter and statistically evaluates the incoming data cells.

A generator 5 is connected to the test sample by a line 45 to a generator input 35. It sends data cells specified by the test to generator input 35, which can be any chosen input. Other generators could be added to the arrangement, e.g. to simultaneously and independently utilize different protocols in the sense of a multi-media test.

In another configuration, the chooser 6 contains an evaluation unit 61, which determines the occurrence of errors in data cells. A connection 46 from the chooser 6 to the generator 5 serves to automatically influence the generator when the information read by the chooser so requires, for example if errors have occurred, which point to an overload.

With an odd number of in- and outputs at the switch, it is advantageous to fully load the smaller number, the rest remain unused, such as e.g. output 28 in FIG. 1.

Generators and analyzers are known for the simulation and measurement of the traffic in lines. In conjunction with the chooser in the depicted arrangement, they enable testing of an ATM-switch with a baseload at the limit of capacity, and with targeted modulation of the load. The process for load testing in this manner is explained with the help of the flow diagram in FIG. 2.

In a first stage 10 of the process, the test sample is purposefully loaded by the signal generator inputting successive baseload data cells, until the required load has been attained. In a second stage 15 of the process, after a certain baseload has been reached, a test sequence is input by the signal generator and measured, and the baseload is modulated at the same time. The effect on the test sequence is analyzed.

As a first step 11, data cells are fed to any input of the test sample, one for each output with a feedback connected to an input. Thus, the cells carry individual markings in the cell head, more precisely in the reference field with the "Virtual Path Identifier" and the "Virtual Channel Identifier" (VPI/VCI). These cause the cell to always reach its predetermined output. It circulates constantly because of the feedback. A special feature of these baseload cells is that they also contain information about the predetermined output in their useful data part. The cells further contain an assignment number, which is assigned in a continuous sequence when the baseload cells are generated. This assignment number makes it possible to detect errors, namely lost cells.

A measurement step 12 is continually performed at a freely chosen output. It determines load and time intervals as a floating medium, which together form a direct measure of the stability of the data traffic in the switching unit. Because of the uniform distribution of the circulating data cells to all in- and outputs, measuring in one area is sufficient. As soon as the fluctuation of both measured values stays within a specified limit, an evaluation step 13, which determines whether the measured load is smaller than the specified load to be attained, is performed. As indicated by a loop 14 in FIG. 2, eventually the first action 11 is repeated, together with the subsequent measurements 12 and evaluation 13. Otherwise the goal of the first stage of the process has been reached, which means the test sample is in a stable condition under a high baseload, and the second stage 15 of the process begins.

In a first step 16 of the second stage 15 of the process, a test sequence is fed to any chosen input, which reaches the freely chosen output where the measurement is made directly, or via several circulation cycles. The test sequence can be produced by the same generator 5 as the baseload, which is input as the first step 11. The measurement step 12 is now expanded with a choosing step 17 which discriminates between data cells of the test sequence and those of the baseload. The former are branched off and routed to for an analysis step 18, the latter are fed back as usual. The test sequence produces an additional load, which could disturb the equilibrium. The result of the measurement provides information in that regard.

However, it is especially interesting to determine what happens to the test sequence when the baseload undergoes a change at the same time. Another step 19 therefore consists in routing individually circulating baseload cells through one or more circulation cycles. This is brought about by routing path cells inside the test sequence, which temporarily changes the routing path from a predetermined input to the freely chosen output of the test sequence. Meanwhile, the VPI/VCI marking is changed in the cell headers of the affected baseload cells. However, the choosing step 17 immediately copies the original marking from the useful data of the baseload cell, and overwrites the marking in the header. Through the switch, the cell returns to its traditional output in the feedback sequence and the assigned input. Viewed symbolically, it runs in a figure eight loop rather than in its traditional cycle, until new routing path cells cancel the change in the routing path. Normally this already takes place after one cycle, so that no significant imbalance occurs in the baseload.

Figure 2:
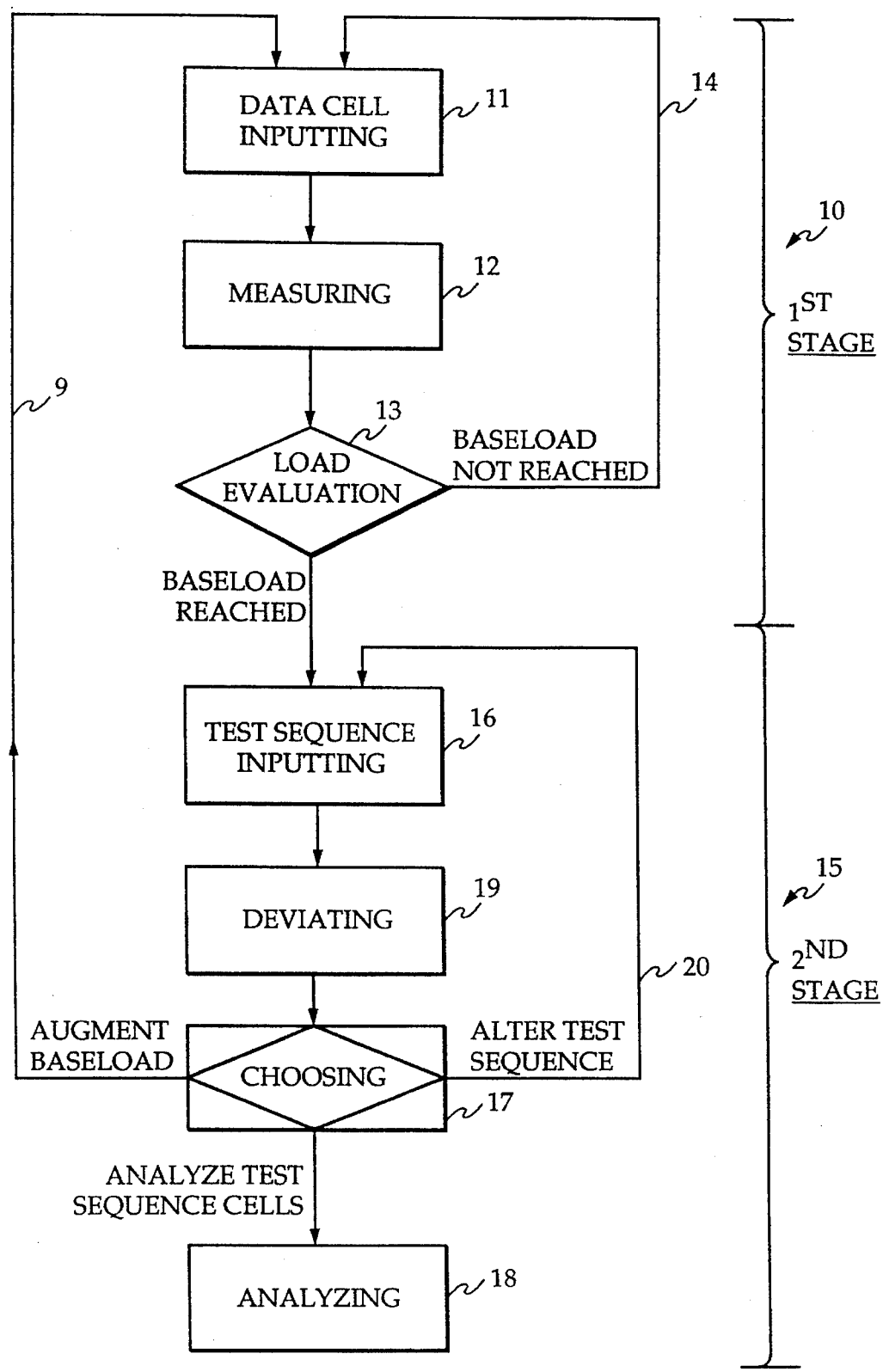
FIG. 2 is a flow diagram of the invention's processes for load testing a switching unit.

If the choosing step 17 determines that errors are on the increase, which can happen based on the assignment number in the useful load, this determination can be used to control the test sequence and to stop it if necessary. The corresponding effect is depicted in FIG. 2 with a feedback line 20. If this is not enough to reestablish the stable condition under high baseload, the choosing step 17 can even eliminate baseload cells, until the stability has been achieved. Subsequently the baseload must be increased, which takes place through a return 9 to the known first step 10. Errors can be detected by test routines used for data in the cell header.

The described process can be used simultaneously in more than one freely chosen output, however, multiple discriminations must then also take place in the choosing step 17.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Method for traffic load testing of a switch having a traffic load limit for cell structured digital data switched through in an asynchronous transfer mode based on their carried-along labeled information which is provided to the switch at a selected traffic baseload of circulating data cells at or near the traffic load limit and, at the same time, providing said traffic baseload of circulating data cells with test data, comprising the following stages of steps:

a first stage (10), comprising the step of:
successively providing data cells for circulating between an assignable input and output of the switch according to data cell content until said selected traffic baseload is achieved, and a second stage (15) comprising the steps of:
superposing test sequences on at least one output, separating the test sequences from the baseload cells by choosing (17) said test sequences at said at least one output and providing said test sequences at a test output (27) for analysis (18).

2. Method according to claim 1, wherein the test sequences contain labeling path cells which alter a labeled path in the switch for one or more of the circulating data cells of the baseload.

3. Method according to claim 2, wherein said choosing (17) determines switching errors and changes the test sequences in such a way that a total load comprising said baseload and said test sequences is reduced in case of an error accumulation.

4. Method according to claim 3, wherein said choosing (17) moreover eliminates selected data cells of the baseload from the circulation until the error accumulation vanishes and wherein, subsequently, a return to the first stage (10) is made in order to augment the baseload to said selected traffic baseload.

5. Method according to claim 1, wherein the choosing (17) determines switching errors and changes the test sequences in such a way that a total load comprising said baseload and said test sequences is reduced in case of an error accumulation.

6. Method according to claim 5, wherein the discrimination choosing (17) moreover eliminates selected data cells of the baseload from the circulation until the error accumulation vanishes and wherein, subsequently, a return to the first stage (10) is made in order to augment the baseload to said selected traffic baseload.

7. Method according to claim 1, wherein the baseload and the test sequence are fed to the same input.

8. Arrangement for the load testing of a switch (1) having a plurality of inputs (3) and outputs (2) for cell structured digital data switched through in an asynchronous transfer mode based on their carried-along labeled information with a plurality of signal connections (4), each from one output of the switch (1) to one input of said switch, wherein at least one signal generator (5) is for connection to a selected one input (35) of the inputs (3) of the switch (1), said signal generator (5) delivering successively baseload data for said outputs which subsequently circulate permanently through the switch (1) due to the plurality of signal connections as well as test data to be forwarded to a measuring output (21) of said outputs (2) for connection to an input of a discriminator (6) having a first output (26) connected to a signal connection (41) between said first output (26) and a return routing input (31) of said inputs, and a second output (27) connected to a signal analyzer (7), said discriminator (6) for providing the baseload data on the signal connection (41) to said return routing input (31) and for providing the test data to said signal analyzer (7).

9. Arrangement according to claim 8, further comprising an evaluating unit (61) in the discriminator (6) that detects errors in data cells of the cell structured digital data, wherein the discriminator has a third output to which a feedback connection (46) is made to the signal generator (5) for controlling the signal generator (5) as a function of the errors detected by the evaluating unit of the discriminator (6).

* * * * *